3,352,695
SILVER POLISH CONTAINING DI-n-
HEXADECYL DISULFIDE
Joseph Iaciofano, Cranston, R.I., assignor to
Gorham Corporation, Providence, R.I.
No Drawing. Filed Jan. 18, 1965, Ser. No. 426,418
14 Claims. (Cl. 106—5)

This invention relates to silver polishes and to silver tarnish retardants and also relates to methods of preparing and employing the same.

One of the problems encountered in preparing silver polishes and the like is that a product is prepared and used which has an undesirable odor.

It is an object of this invention to provide an improved silver polish and tarnish retardant which has a neutral odor and therefore avoids one of the basic problems with which the prior techniques are concerned.

It is another object of the invention to provide an improved technique for inhibiting the tarnishing of silver articles.

In achieving the above and other of its objectives the invention contemplates the provision and use of a silver polish having a silver tarnish retardant constituted by di-n-hexadecyl disulfide.

It has been found that di-n-hexadecyl disulfide may be employed in silver polishes as a silver tarnish retardant without having an offensive odor so that its use provides various advantages.

Generally, the di-n-hexadecyl disulfide employed in accordance with the invention is used in an amount of 4 to 10% by weight of the polish into which it is incorporated. In association therewith there will be generally employed 40 to 70% by weight of water and 10 to 20% of an abrasive such as snowfloss which is a diatomaceous or infusorial earth of average particle size of 1–2 $\mu$.

Amongst the various other ingredients which can be employed in the silver polish generally indicated above are isopropanol, Tergitol, aqua ammonia, triethanolamine, oleic acid, Carbowax, a scenting agent and cellulose gum.

The isopropanol when it is employed is preferably employed in an amount of 10 to 20% by weight of the polish into which this substance is incorporated.

The Tergitol is preferably employed in an amount of 1 to 3% by weight of the polish into which this substance is incorporated.

The aqua ammonia is employed in an amount of 0.5–1% by weight, whereas the triethanolamine is employed in an amount of 1.1–2% by weight.

The oleic acid is employed in an amount of 2.4–4.0% and the Carbowax is employed preferably in an amount in the range of 2 to 35% by weight.

The scenting agent and cellulose gum are preferably employed in amounts of .5–3.0% and .5–.6% by weight respectively.

The invention will be more clearly understood from the following examples of polishes employing the inhibitor of the invention.

EXAMPLE I

| | Percent |
|---|---|
| Water | 60.0 |
| Tergitol (wetting agent) | 2.0 |
| Snowfloss (abrasive) | 20.0 |
| Triethanolamine | 2.0 |
| Oleic acid | 4.0 |
| Di-n-hexadecyl disulfide | 10.0 |
| Carbowax 1500 | 2.0 |

EXAMPLE II

| | |
|---|---|
| Water | 70.0 |
| Tergitol (wetting agent) | 2.0 |
| Snowfloss (abrasive) | 15.0 |
| Triethanolamine | 2.0 |
| Oleic acid | 4.0 |
| Di-n-hexadecyl disulfide | 5.0 |
| Carbowax 1500 | 2.0 |

EXAMPLE III

| | |
|---|---|
| Water | 52.5 |
| Isopropanol | 20.0 |
| Snowfloss (abrasive) | 15.0 |
| Aqua ammonia | 0.5 |
| Triethanolamine | 1.5 |
| Oleic acid | 3.0 |
| Di-n-hexadecyl disulfide | 5.0 |
| Carbowax 1500 | 2.0 |
| Scenting agent | 0.5 |

EXAMPLE IV

| | |
|---|---|
| Water | 69.0 |
| Snowfloss (abrasive) | 15.0 |
| Aqua ammonia | 0.5 |
| Triethanolamine | 2.0 |
| Oleic acid | 4.0 |
| Di-n-hexadecyl disulfide | 5.0 |
| Carbowax 1500 | 4.0 |
| Scenting agent | 0.5 |

EXAMPLE V

| | |
|---|---|
| Water | 40.0 |
| Tergitol (wetting agent) | 3.0 |
| Snowfloss (abrasive) | 17.0 |
| Di-n-hexadecyl disulfide | 5.0 |
| Carbowax 1500 | 35.0 |

EXAMPLE VI

| | |
|---|---|
| Water | 65.0 |
| Isopropanol | 10.0 |
| Snowfloss (abrasive) | 15.0 |
| Aqua ammonia | 0.5 |
| Triethanolamine | 1.1 |
| Oleic acid | 2.4 |
| Di-n-hexadecyl disulfide | 5.0 |
| Scenting agent | 0.5 |
| Cellulose gum | 0.5 |

EXAMPLE VII

| | |
|---|---|
| Water | 50.0 |
| Tergitol (wetting agent) | 3.0 |
| Snowfloss (abrasive) | 17.0 |
| Aqua ammonia | 0.5 |
| Di-n-hexadecyl disulfide | 5.0 |
| Carbowax 1500 | 24.0 |
| Scenting agent | 0.5 |

EXAMPLE VIII

| | |
|---|---|
| Water | 59.0 |
| Tergitol (wetting agent) | 3.0 |
| Snowfloss (abrasive) | 17.0 |
| Aqua ammonia | 0.5 |
| Di-n-hexadecyl disulfide | 5.0 |
| Carbowax 1500 | 15.0 |
| Scenting agent | 0.5 |

EXAMPLE IX

| | |
|---|---|
| Water | 65.0 |
| Tergitol (wetting agent) | 3.0 |
| Snowfloss (abrasive) | 17.0 |
| Aqua ammonia | 0.5 |
| Di-n-hexadecyl disulfide | 5.0 |
| Carbowax 1500 | 9.0 |
| Scenting agent | 0.5 |

EXAMPLE X

| | Percent |
|---|---|
| Water | 65.0 |
| Tergitol (wetting agent) | 1.0 |
| Snowfloss (abrasive) | 20.0 |
| Aqua ammonia | 1.0 |
| Triethanolamine | 2.0 |
| Oleic Acid | 4.0 |
| Di-n-hexadecyl disulfide | 5.0 |
| Carbowax 1500 | 2.0 |

EXAMPLE XI

| | |
|---|---|
| Water | 65.0 |
| Tergitol (wetting agent) | 1.0 |
| Snowfloss (abrasive) | 20.0 |
| Di-n-hexadecyl disulfide | 6.0 |
| Carbowax 1500 | 5.0 |
| Scenting agent | 3.0 |

EXAMPLE XII

| | |
|---|---|
| Water | 84.0 |
| Tergitol (wetting agent) | 1.0 |
| Snowfloss (abrasive) | 10.0 |
| Di-n-hexadecyl disulfide | 4.4 |
| Cellulose gum | 0.6 |

In the above examples the water is employed as a carrier whereas the Carbowax, which is Carbowax 1500 preferably, is employed for suspending the abrasive as well as for its anti-corrosive activity. The Carbowax 1500 is a polyethylene glycol the molecular weight of which is 1500. It has the general formula $HOCH_2(CH_2OCH_2)_xCH_2OH$.

The oleic acid and the triethanolamine cooperatively form the soap which is employed for cleaning action. The isopropanol when employed is effective to clean and also acts as a suspension agent.

The Tergitol employed is preferably Tergitol NPX which is used as a wetting agent and more particularly is a non-ionic surface active agent, chemically known as alkyl aryl polyethylene glycol.

The scenting agent indicated in the examples can be employed for imparting a particular odor of choice. However, since it is one of the principal objects of the invention to provide for a neutral odor, the flavor can be dispensed with as desired.

The aqua ammonia indicated above in some of the examples is employed as a cleaning agent, whereas the Snowfloss employed in the examples is used as an abrasive.

As to the methods and techniques of the invention, these involve cleaning and preventing silver from tarnishing by applying to a silver article one of the above-noted formulae in such a manner that the tarnish is removed therefrom. A tarnish preventing film is automatically formed on the article which prevents the article from subsequently tarnishing.

More particularly, the method of the invention contemplates the application to a silver article of di-n-hexadecyl disulfide and in accordance with such technique the objectives of the invention are achieved.

There will now be obvious to those skilled in the art many modifications and variations of the methods and formulae set forth above. These modifications and variations will not depart from the scope of the invention as defined by the following claims.

What is claimed is:

1. A silver polish comprising 40–70% water, 10–20% of an abrasive, 1–3% of a wetting agent and 4–10% di-n-hexadecyl disulfide.

2. A silver polish comprising 40–70% water, 10–20% of an abrasive, 10–20% isopropanol, 1–3% of a wetting agent, 0.5–1% aqua ammonia, 1.1–2% triethanolamine, 2.4–4% oleic acid, 2–35% polyethylene glycol, 0.5–3% of a scenting agent, 0.5–0.6% of a cellulose gum and 4–10% di-n-hexadecyl disulfide.

3. A silver polish constituted of 60% water, 2% of a wetting agent, 20% of an abrasive, 2% triethanolamine, 4% oleic acid, 2% polyethylene glycol and 10% di-n-hexadecyl disulfide.

4. A silver polish constituted of 70% water, 2% of a wetting agent, 15% of an abrasive, 2% triethanolamine, 4% oleic acid, 2% polyethylene glycol and 5% di-n-hexadecyl disulfide.

5. A silver polish constituted of 52.5% water, 20% isopropanol, 15% of an abrasive, 0.5% aqua ammonia, 1.5% triethanolamine, 3% oleic acid, 2% polyethylene glycol, 0.5% of a scenting agent and 5% di-n-hexadecyl disulfide.

6. A silver polish constituted of 69% water, 15% of an abrasive, 0.5% aqua ammonia, 2% triethanolamine, 4% oleic acid, 4% polyethylene glycol, 0.5% of a scenting agent and 5% di-n-hexadecyl disulfide.

7. A silver polish constituted of 40% water, 35% polyethylene glycol, 17% of an abrasive, 3% of a wetting agent and 5% di-n-hexadecyl disulfide.

8. A silver polish constituted of 65% water, 10% isopropanol, 15% of an abrasive, 0.5% aqua ammonia, 1.1% triethanolamine, 2.4% oleic acid, 0.5% of a scenting agent, 0.5% of a cellulose gum and 5% di-n-hexadecyl disulfide.

9. A silver polish constituted of 50% water, 17% of an abrasive, 24% polyethylene glycol, 3% of a wetting agent, 0.5% aqua ammonia, 0.5% of a scenting agent and 5% di-n-hexadecyl disulfide.

10. A silver polish constituted of 59% water, 17% of an abrasive, 15% polyethylene glycol, 3% of a wetting agent, 0.5% aqua ammonia, 0.5% of a scenting agent and 5% di-n-hexadecyl disulfide.

11. A silver polish constituted of 65% water, 17% of an abrasive, 9% polyethylene glycol, 3% of a wetting agent, 0.5% aqua ammonia, 0.5% of a scenting agent and 5% di-n-hexadecyl disulfide.

12. A silver polish constituted of 65% water, 20% of an abrasive, 1% of a wetting agent, 1% aqua ammonia, 2% triethanolamine, 4% oleic acid, 2% polyethylene glycol and 5% di-n-hexadecyl disulfide.

13. A silver polish constituted of 65% water, 20% of an abrasive, 1% of a wetting agent, 5% polyethylene glycol, 3% of a scenting agent and 6% di-n-hexadecyl disulfide.

14. A silver polish constituted of 84% water, 10% of an abrasive, 1% of a wetting agent, 0.6% of a cellulose gum and 4.4% di-n-hexadecyl disulfide.

References Cited

UNITED STATES PATENTS

| | | | |
|---|---|---|---|
| 2,691,593 | 10/1954 | Avedikian | 106—10 XR |
| 2,703,784 | 3/1955 | Fields | 106—14 XR |
| 2,841,501 | 7/1958 | Murphy | 106—3 |
| 2,956,888 | 10/1960 | Gunning | 106—10 |

FOREIGN PATENTS

| | | |
|---|---|---|
| 640,148 | 10/1946 | Great Britain. |
| 715,505 | 9/1954 | Great Britain. |

ALEXANDER H. BRODMERKEL, *Primary Examiner.*

J. B. EVANS, *Assistant Examiner.*